G. C. GILL.
BURNER.
APPLICATION FILED FEB. 15, 1912.
1,039,513.
Patented Sept. 24, 1912.
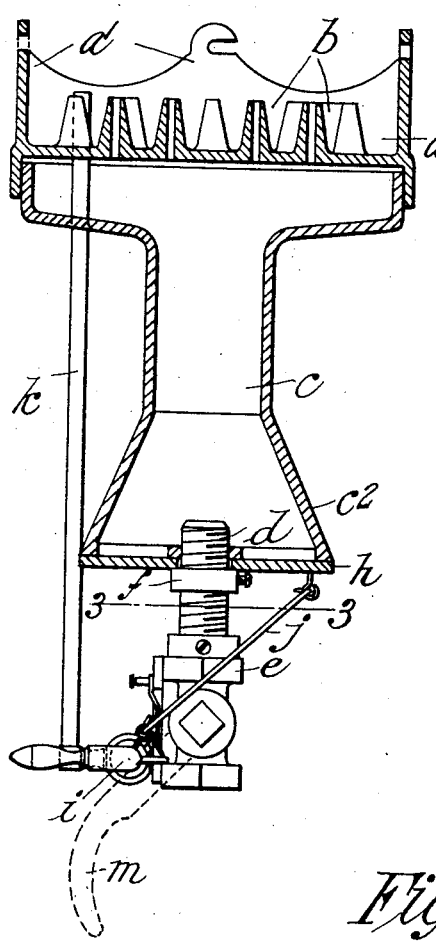
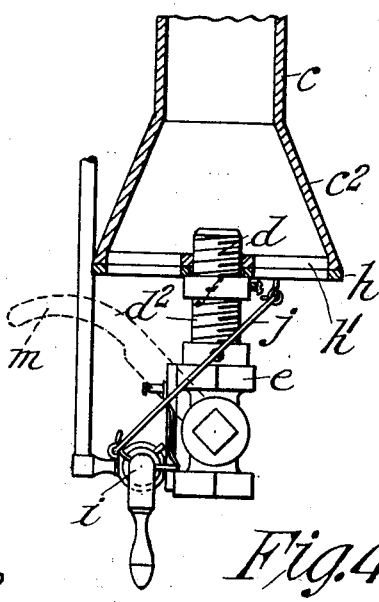
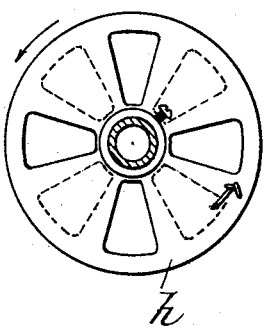
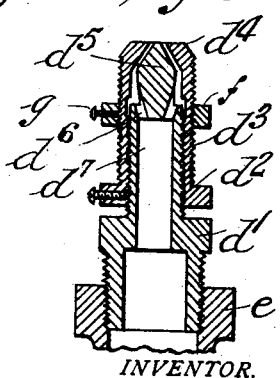
WITNESSES:
Franklin G. Neal
Harry W. Bowen
INVENTOR,
George C. Gill,
BY Chapin & Co.
ATTORNEY.

UNITED STATES PATENT OFFICE.

GEORGE C. GILL, OF HOLYOKE, MASSACHUSETTS, ASSIGNOR TO BARLOW COMPANY, OF HOLYOKE, MASSACHUSETTS, A CORPORATION OF MASSACHUSETTS.

BURNER.

1,039,513.  Specification of Letters Patent.  Patented Sept. 24, 1912.

Application filed February 15, 1912.  Serial No. 677,701.

*To all whom it may concern:*

Be it known that I, GEORGE C. GILL, a citizen of the United States of America, residing at Holyoke, in the county of Hampden and State of Massachusetts, have invented new and useful Improvements in Burners, of which the following is a specification.

This invention relates to improvements in instantaneous hot water heaters of the type in which coils are used to convey the water while being heated by means of a gas flame, the burner of which is preferably located below the coils.

The improvement has for its object to prevent the flaring back of the flame at the moment the burner is ignited. It sometimes occurs in this class of water heaters that at the moment the gas is turned on and the burner ignited, the operator's hand is liable to be burned by the flames blowing toward the lower end of the mixing chamber.

The invention, in general, relates to a construction for a burner which is adapted to close the lower end of the mixing chamber simultaneously with the turning on of the gas supply to the pilot lamp and opening this shutter after the tips of the burner have all been ignited by the main supply.

In the drawings forming part of this application,—Figure 1 is a vertical, sectional view through the axis of the burner, showing the pilot pipe, the operating valve, and the connecting link between the shutter and the valve, the shutter being shown closed. Fig. 2 is a view showing the lower portion of the mixing chamber and the shutter in open position after the pilot valve has been closed. Fig. 3 is a bottom plan view on the line 3—3, Fig. 1, looking upward. Fig. 4 is a vertical sectional view of the gas supply tip.

Referring to the drawings in detail, $a$ designates the burner as a whole which is provided with a plurality of burner-tips $b$. The burner is designed for attachment, as shown at $a^1$, to the lower part of the heater in which the coils are located, the heater proper not being shown.

Downwardly extending from the burner $a$ is a cylindrical shaped air-mixing chamber $c$, the lower end of which is formed with an outwardly flaring portion $c^2$. Extending into this part is a gas supply inlet $d$, the detail construction of which is shown in Fig. 4, and comprises a squared or angular shaped portion $d^1$, that is adapted to be connected to the valve casing $e$.

$d^2$ indicates an internally threaded sleeve adapted to be adjusted on the externally threaded stem $d^3$ of the gas supply tip. The sleeve $d^2$ is formed with a conical-shaped opening $d^4$ which is located over a double cone shaped extension portion $d^5$ of the stem $d^3$, whereby the opening $d^4$ between these two parts may be adjusted to vary the flow of gas. Openings $d^6$ lead from the interior portion $d^7$ of the stem $d^3$ to the opening $d^4$.

A collar $f$ is placed on the threaded stem part $d$ and is secured in place by means of a set-screw $g$. A shutter $h$ is rotatably supported on this collar, as shown in Figs. 1 and 2. Extending from the shutter to the pilot valve $i$ is the link $j$. When the pilot valve is opened to permit the gas to flow to the pilot lamp pipe $k$ the shutter is moved to a closed position, as shown in Fig. 1, and when the valve $i$ is closed, as shown in Fig. 2, the shutter $h$ is opened. The automatic opening and closing of the shutter, when the pilot-valve $i$ is opened and closed prevents all danger of back-firing at the lower end of the mixing chamber $c$, and this affords protection to the person while lighting the burner at the tips $b$. It should be understood that the shutter is left in a closed position until after the main gas supply is turned on, by means of the handle $m$. After the burner tips are all lighted, the operator then shuts off the flow of gas to the pilot pipe $k$ by means of the handle $i$, whereby the shutter $h$ is opened and the air permited to flow to the mixing chamber $c$ through the openings $h^1$.

What I claim, is:—

1. The combination with a gas burner having burner tips, an air inlet, a gas inlet, means for conducting the gas and air to the burner-tips, and a shutter controlling the air inlet, of an igniting burner adjacent the burner tips, a gas supply pipe connected to the igniting burner, a valve connected to the gas supply pipe, and a device connecting the shutter and valve and adapted to close the shutter when the valve is opened and to open the shutter when the valve is closed.

2. In a device to prevent back firing in a gas burner, the combination with said burner, means for supplying gas and means for supplying air thereto, a shutter to control the air supply to the burner, of an igniting device for the burner, a gas supply pipe leading to the igniting device, means in said gas supply pipe to control the flow of gas therethrough, and a device connecting the shutter and said gas controlling means in the gas supply pipe to close the shutter when the gas controlling means is opened and to open the shutter when said gas controlling means is closed.

GEORGE C. GILL.

Witnesses:
CORA P. CLEVELAND,
GORHAM P. HOSMER.

Copies of this patent may be obtained for five cents each, by addressing the "Commissioner of Patents, Washington, D. C."